(12) United States Patent
Ponnamreddy et al.

(10) Patent No.: US 11,039,304 B2
(45) Date of Patent: Jun. 15, 2021

(54) MOBILE DEVICES AND METHODS FOR SELECTIVELY ALLOWING RADIO-FREQUENCY (RF) RESOURCE SHARING BETWEEN STACKS

(71) Applicant: Samsung Electronics Co., Ltd., Suwon-si (KR)

(72) Inventors: Goutham Ponnamreddy, Bangalore (IN); Umasankar Ceendhralu Baskar, Bangalore (IN); Nikhil Patni, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/566,072

(22) Filed: Sep. 10, 2019

(65) Prior Publication Data

US 2021/0014672 A1    Jan. 14, 2021

(30) Foreign Application Priority Data

Jul. 9, 2019   (IN) .......................... IN201941027504

(51) Int. Cl.
| | |
|---|---|
| *H04W 8/26* | (2009.01) |
| *H04W 4/50* | (2018.01) |
| *H04L 29/06* | (2006.01) |
| *H04W 4/14* | (2009.01) |
| *H04W 76/19* | (2018.01) |

(52) U.S. Cl.
CPC ............. *H04W 8/26* (2013.01); *H04L 65/608* (2013.01); *H04W 4/14* (2013.01); *H04W 4/50* (2018.02); *H04W 76/19* (2018.02)

(58) Field of Classification Search
CPC ....................................................... H04W 8/26
See application file for complete search history.

(56) References Cited

U.S. PATENT DOCUMENTS

| | | | |
|---|---|---|---|
| 9,131,429 B1 | 9/2015 | Bharadwaj et al. | |
| 9,516,557 B2 | 12/2016 | Zhu et al. | |
| 9,674,758 B2 | 6/2017 | Tsai et al. | |
| 2014/0364118 A1 | 12/2014 | Belghoul et al. | |
| 2015/0085762 A1* | 3/2015 | Matin | H04W 24/02 370/329 |

(Continued)

*Primary Examiner* — Edan Orgad
*Assistant Examiner* — Won Tae C Kim
(74) *Attorney, Agent, or Firm* — Harness, Dickey & Pierce, P.L.C.

(57) ABSTRACT

A method performed by a mobile device for selectively allowing radio-frequency (RF) resource sharing between a plurality of subscriptions associated with a plurality of subscriber identity modules (SIMs) in the mobile device, the method includes transferring access to an RF resource from a first subscription among the plurality of subscriptions to a second subscription among the plurality of subscriptions during an ongoing service through the first subscription based on occurrence of a condition, evaluating one or more network parameters pertaining to communication through the first subscription, and causing the first subscription and the second subscription to share access to the RF resource for a first defined time period based on the evaluating such that message communication through the second subscription is enabled without disconnecting the first subscription from the ongoing service.

13 Claims, 11 Drawing Sheets

(56) References Cited

U.S. PATENT DOCUMENTS

| | | | |
|---|---|---|---|
| 2015/0094071 A1* | 4/2015 | Hang | H04W 76/19 |
| | | | 455/450 |
| 2016/0204908 A1* | 7/2016 | Rafique | H04L 1/0014 |
| | | | 370/252 |
| 2017/0094485 A1 | 3/2017 | Saxena et al. | |
| 2017/0094628 A1 | 3/2017 | Miao et al. | |
| 2017/0181048 A1* | 6/2017 | Shah | H04L 65/1016 |
| 2020/0136733 A1* | 4/2020 | Hassan Hussein | H04W 52/46 |

* cited by examiner

US 11,039,304 B2

MOBILE DEVICES AND METHODS FOR SELECTIVELY ALLOWING RADIO-FREQUENCY (RF) RESOURCE SHARING BETWEEN STACKS

CROSS-REFERENCE TO RELATED APPLICATION

This application claims priority under 35 U.S.C. § 119 to Indian Patent Application No. 201941027504 filed on Jul. 9, 2019, in the Indian Intellectual Property Office, the disclosure of which is incorporated by reference herein in its entirety.

FIELD

Some example embodiments of the inventive concepts relate to telecommunications and in-particular relates to radio-frequency sharing with respect to a mobile-device.

BACKGROUND

A Multi-SIM wireless communication device is known to hold two or more subscriber identity module (SIM) cards, thereby enabling the device to render two or more different Mobile Station International Subscriber Directory Numbers (MSISDNs) and allowing simultaneous or contemporaneous access of different services using the MSISDNs.

A Dual SIM Dual Standby (DSDS)/Multi-SIM UE comprises a single transmitter and one or more receivers. In such devices, one SIM may use RF resources for transmitting and/or receiving signals at a time. In other words, while a device actively transmits and/or receives communications from a service associated with one MSISDN, another service/MSISDN is put on standby. For example, when a voice-call is established on, a SIM1, the RF resources are occupied by the SIM1 while a SIM2 is maintained in a suspended-state.

In an example-operation of Multi SIM/DSDS devices, when a Voice over Long Term Evolution (LTE) (VoLTE) call is ongoing at a SIM1 (e.g., Main-SIM), a SIM2 (e.g., second SIM in dual/multi SIM device) is suspended or put on standby. The suspension/standby of the SIM2 causes inconvenience to the user (e.g., excessive delay and/or resource consumption) during a typical scenario where the user wants to send and/or receive Short Message Service (SMS)/Unstructured Supplementary Service Data (USSD) data and/or codes, etc. from the SIM2.

In an example scenario as depicted in FIG. 1, as a user attempts to perform a VoLTE-Call operation on the SIM1, the SIM2/other SIMs is in suspended state. During VoLTE Call ongoing at SIM1, the user or a third party may be performing Bank transaction (e.g., payment-transaction) and may expect to receive a one-time password (OTP) (e.g., bank transaction/online payments) message at a registered-number (e.g., the SIM2). Since the SIM2 is in suspended state, the user is likely to miss the receipt of the OTP message as the SIM1 is unable to receive the message communication. Accordingly, the user is compelled to disconnect the Call at the SIM1 to resume the otherwise suspended SIM2/Other SIMs to timely receive the SMS and complete the payment-transaction.

Likewise, in other scenario as depicted in FIG. 2, during the ongoing VoLTE Call at the SIM1, the user wants to send an SMS message to a service provider through the SIM2 (e.g. a direct-to-home (DTH) operator to ascertain a balance and/or to activate and/or deactivate certain television broadcast channels). However, as long as the SIM1 is engaged with the VoLTE call, the user is unable to send the SMS message. Accordingly, again the user is forced to disconnect the call at the SIM1 in order to resume the suspended SIM2/other SIMs, which is the registered and/or authorized SIM, to send the SMS to the DTH operator.

While Dual SIM Dual Active (DSDA) based wireless devices exist as an alternative to DSDS devices, DSDA devices have their own demerits. DSDA devices include two transceivers and two SIM cards, such that a DSDA device may actively transmit and/or receive communications from services associated with two MSISDNs at the same-time unlike the DSDS scheme. However, such a facility is achieved through the use of duplicate/additional hardware (e.g., the second transceiver), thereby resulting in additional-costs for the duplicate/additional hardware.

It would be desirable to facilitate efficient sharing of RF resources during a VoLTE call on the main stack (e.g., the SIM1) in a DSDS device.

It would be desirable to resume a peer stack (e.g., resume the suspended SIM2/other SIMs) and thereby trigger an SMS origination and/or reception during the VoLTE Call on the main stack (e.g., the SIM1) in the DSDS device.

SUMMARY

This summary is provided to introduce a selection of concepts in a simplified format that are further described in the detailed description. This summary is not intended to identify key or essential inventive concepts of the claimed subject matter, nor is it intended for determining the scope of the claimed subject matter.

The present subject matter at least illustrates a method performed by a mobile device for selectively allowing radio-frequency (RF) resource sharing between a plurality of subscriptions associated with a plurality of subscriber identity modules (SIMs) in the mobile device. The method includes transferring access to an RF resource from a first subscription among the plurality of subscriptions to a second subscription among the plurality of subscriptions during an ongoing service through the first subscription based on occurrence of a condition, evaluating one or more network parameters pertaining to communication through the first subscription, and causing the first subscription and the second subscription to share access to the RF resource for a first defined time period based on the evaluating such that message communication through the second subscription is enabled without disconnecting the first subscription from the ongoing service.

Based on evaluation of said parameters, a radio frequency-resource is allowed to be shared between the first and second subscriptions for a defined time period to thereby allow the message-communication through the second-subscription during such time period while keeping the ongoing service on the first subscription active. Such time-period may be calculated in real-time.

In a further implementation, the present subject matter at-least illustrates a system for selectively allowing radio-frequency (RF) resource sharing between a plurality of subscriptions associated with a plurality of subscriber identity modules (SIMs) in the mobile device. The mobile device includes at least one processor configured to execute computer-readable instructions to transfer access to an RF resource from a first subscription among the plurality of subscriptions to a second subscription among the plurality of subscriptions during an ongoing service through the first subscription based on occurrence of a condition, evaluate one or more network parameters pertaining to communication through the first subscription, and causing the first subscription and the second subscription to share the RF resource for a first defined time period based on the one or more network parameters such that message communication through the second subscription is enabled without disconnecting the first subscription from the ongoing service.

To further clarify advantages and features of some example embodiments of the inventive concepts, a more particular description of the inventive concepts will be rendered by reference to specific embodiments thereof, which are illustrated in the appended drawings. It is appreciated that these drawings depict only typical embodiments of the inventive concepts and are therefore not to be considered limiting of its scope. The inventive concepts will be described and explained with additional specificity and detail with the accompanying drawings.

BRIEF DESCRIPTION OF FIGURES

These and other features, aspects, and advantages of the inventive concepts will become better understood when the following detailed description is read with reference to the accompanying drawings in which like characters represent like parts throughout the drawings, wherein.

Figure 1:
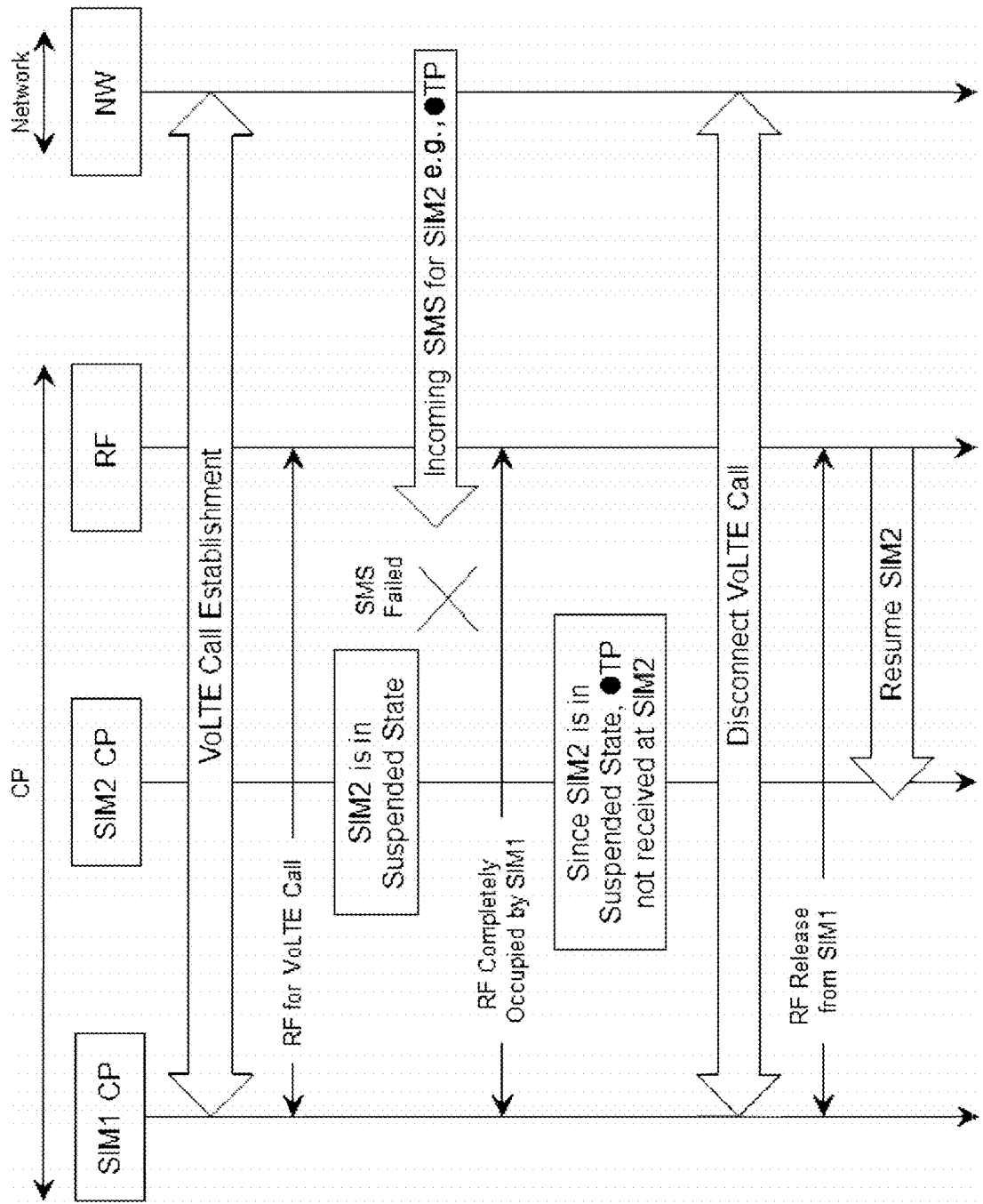
FIG. 1 shows a prior-art operation in computing devices.
Figure 2:
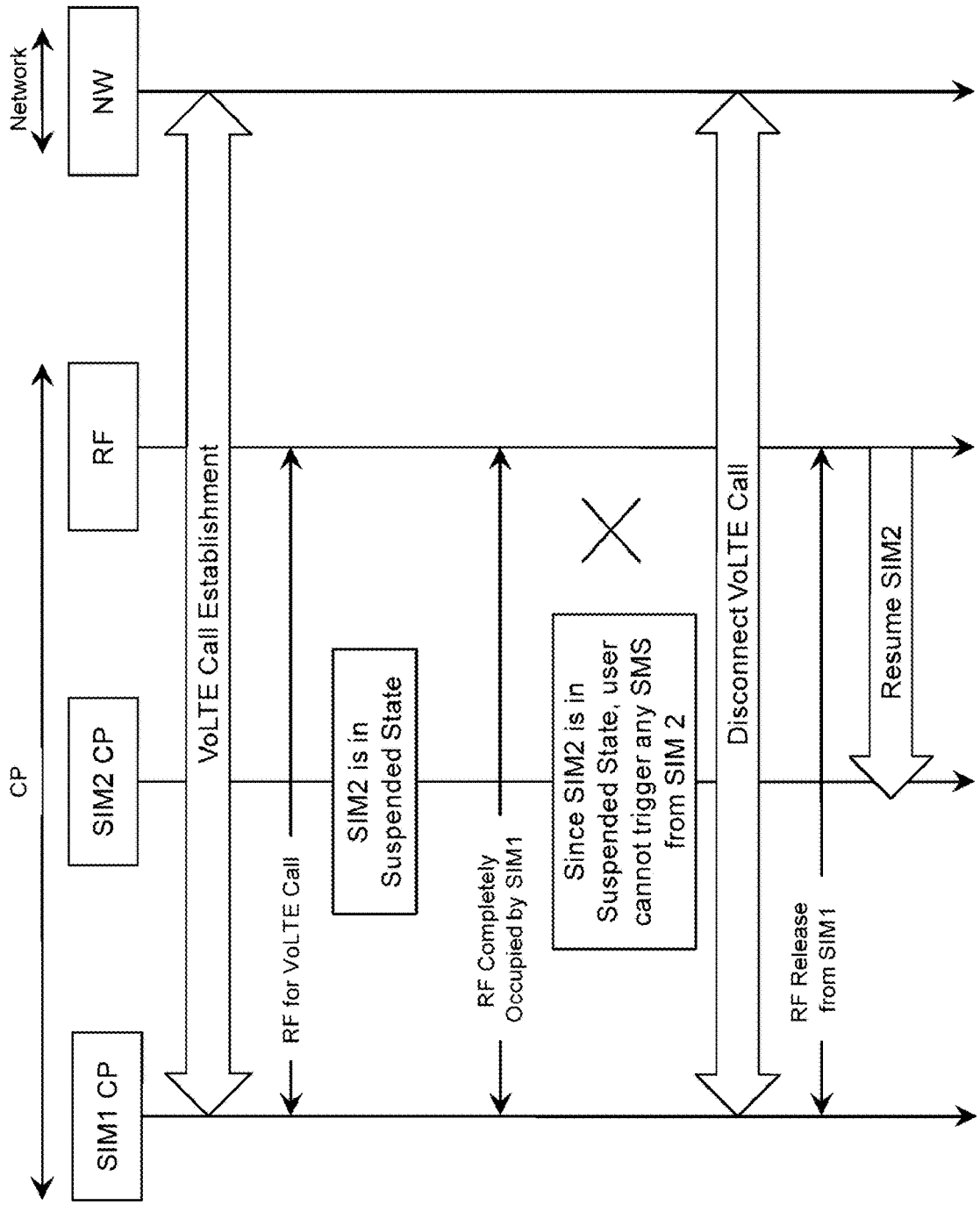
FIG. 2 shows another prior-art operation in computing devices.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the inventive concepts. Furthermore, in terms of the construction of the device, one or more components of the device may have been represented in the drawings by conventional symbols, and the drawings may show only those specific details that are pertinent to understanding some example embodiments of the inventive concepts so as not to obscure the drawings with details that will be readily apparent to those of ordinary skill in the art having benefit of the description herein.

DETAILED DESCRIPTION

For the purpose of promoting an understanding of the principles of the inventive concepts, reference will now be made to some example embodiments illustrated in the drawings and specific language will be used to describe the same. It will nevertheless be understood that no limitation of the scope of the inventive concepts is thereby intended, such alterations and further modifications in the illustrated system, and such further applications of the principles of the inventive concepts as illustrated therein being contemplated as would normally occur to one skilled in the art to which the inventive concepts relate.

It will be understood by those skilled in the art that the foregoing general description and the following detailed description are explanatory of the inventive concepts and are not intended to be restrictive thereof.

Reference throughout this specification to "an aspect", "another aspect" or similar language means that a particular feature, structure, or characteristic described in connection with an embodiment is included in at least one embodiment of the inventive concepts. Thus, appearances of the phrase "in an embodiment", "in some example embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which the inventive concepts belongs. The system, methods, and examples provided herein are illustrative only and not intended to be limiting.

Some example embodiments of the inventive concepts will be described below in detail with reference to the accompanying drawings.

Figure 3:
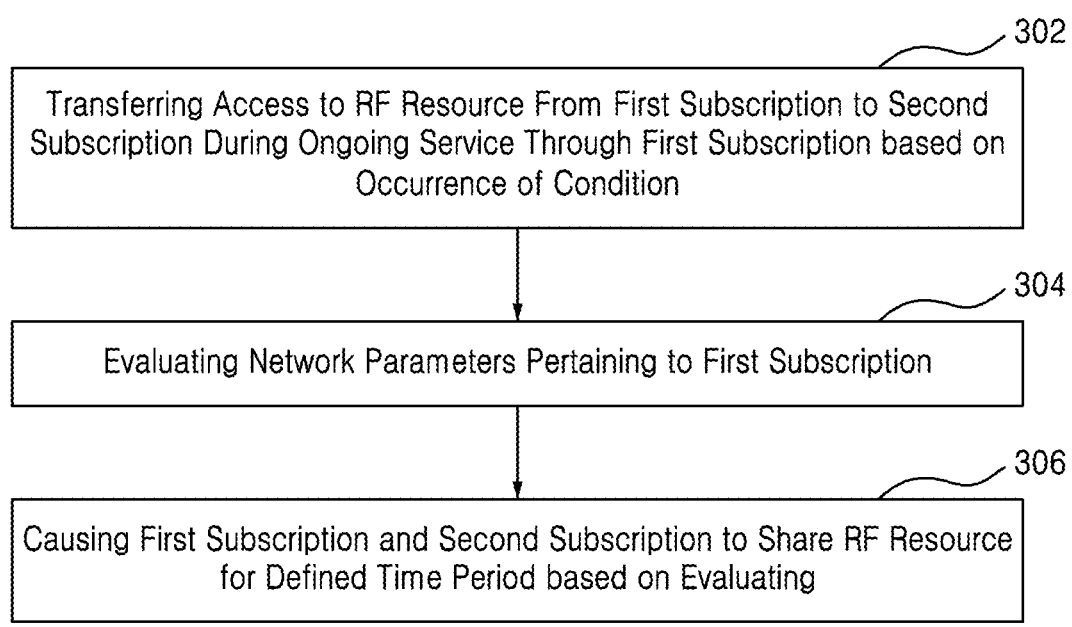
FIG. 3 shows a method in accordance with some example embodiments of the inventive concepts.

Now referring to FIG. 3, the present subject matter illustrates a method for selectively allowing radio-frequency (RF) resource sharing between stacks in a mobile device operating upon a plurality of subscriber identity modules (SIM). In an example, the method renders a solution by identifying a critical SMS message origination and/or reception, and evaluating conditions for resuming a peer stack during a VoLTE Call on a Main Stack, and thereby facilitates efficient RF sharing.

The method comprises executing (operation 302) a message communication based service through a second subscription during an ongoing service through a first subscription, based on occurrence of a condition. In some example embodiments, the mobile device may transfer access to an RF resource from the first subscription (e.g., the first SIM/stack) to the second subscription (e.g., the second SIM/stack). In an example, each of the first-subscription and the second-subscription may be at least one of LTE, Wideband Code Division Multiple Access (WCDMA), and/or CDMA. The ongoing service on the first subscription may correspond to at least one of: a VoLTE call, a communication on a packet-switched network, and/or a communication on a circuit-switched network. Such first and second subscriptions may operate over a radio access technology and/or a mobile communication standard defined by at least one of: $4^{th}$ Generation (4G) (e.g., 4G-LTE), $3^{rd}$ Generation (3G), and/or $2^{nd}$ Generation (2G).

The condition may be associated with the execution of the message communication through the second-subscription. For example, the condition may be a user-request received via a user-interface (e.g., a user-interface of the mobile device) during the ongoing service at the first subscription for availing said message communication through the second-subscription. In another example, the condition may be a defined setting to allow said message-communication through the second subscription during the ongoing service through the first subscription. The condition as associated with the message communication through the second subscription may be defined by at least one of: sending an SMS message, receiving an SMS message, sending and/or receiving a packet-switched based message communication, and/or sending and/or receiving a message via an internet-browsing session.

Further, one or more network-parameters pertaining to the first subscription may be evaluated (operation 304) (e.g., by the mobile device), the network-parameters pertaining to at least one of: a signal strength, a block error rate (BLER), and/or Real-Time Transport Protocol (RTP) Control Protocol (RTCP) timer. Such evaluation of network parameters corresponds to evaluation of possibility (e.g., determining a probability and/or likelihood) of an SMS message origination and/or reception through the second subscription.

Based on evaluation of said network parameters, sharing of a radio frequency (RF) resources (also referred to herein in the singular form, e.g., the "RF resource") may be allowed (operation 306) (e.g., by the mobile device) between the first and second subscriptions for a defined time period to thereby allow the message communication through the second-subscription during said time period while keeping the ongoing service on the first subscription active. Said time period may be calculated in real-time. For example, in some example embodiments, the sharing of the RF resource includes the mobile device causing the first subscription (e.g., first SIM/stack) and the second subscription (e.g., second SIM/stack) to share access to the RF resource for the defined time based on the evaluation of operation 304 such that message communication through the second subscription is enabled without the first subscription becoming disconnected from the ongoing service.

The defined time-period may be calculated (e.g., by the mobile device) based on one of more of N310, T310 and/or RTCP timers when the first subscription communicates with the ongoing service via 4G-LTE. When the first subscription communicates with the ongoing service via 3G-Universal Mobile Telecommunications Service (UMTS), the time period may be based on N313, T313, T314 and/or T315. When the first subscription communicates with the ongoing service via 2G-Global System for Mobile Communications (GSM), the time period may be based on a Slow Associated Control Channel (SACCH) count.

In an example, the sharing of the RF resource between the first and second subscription comprises maintaining the ongoing service on first subscription on hold (e.g., pausing communication without disconnecting from the ongoing service) while allowing the messaging communication through the second subscription during the defined time period. For example, in some example embodiments, the mobile device may cause the ongoing service to be placed on hold on the first subscription while allowing the message communication through the second subscription during the defined time period. The ongoing service may be resumed through the first-subscription, upon the expiry of the defined time period and/or upon occurrence of a messaging event through the second subscription. For example, in some example embodiments, the mobile device may cause the ongoing service to resume through the first subscription upon occurrence of a messaging event through the second subscription. Such an example of RF-sharing has been further diagrammatically illustrated in FIG. 6.

In another example, the sharing of the RF resource between the first and second subscription comprises maintaining the ongoing service on the first subscription on-hold while allowing the messaging communication through the second subscription during the defined time period. In case of absence of any messaging event (e.g., mobile-originated (MO) or mobile-terminated (MT) based messaging event) through the second subscription till the expiry of the defined time period, the first subscription and the second subscription may be synchronized based on a determined duty-cycle based RF resource sharing procedure defined by pause and resume modes. For example, in some example embodiments, the mobile device may synchronize the first subscription and the second subscription based on a determined duty-cycle based RF resource sharing procedure defined by pause and resume modes, said synchronizing being performed based on a mobile-originated or mobile-terminated based messaging event not being sent through the second subscription within the first defined time period. The ongoing-service is resumed through the first subscription upon occurrence of said messaging event through the second subscription a) during the defined time period or b) during said synchronization between the first and second subscription. Such an example of RF-sharing has been further diagrammatically illustrated in FIG. 7.

In yet another example, the sharing of the RF resource between the first and second subscriptions comprises maintaining the ongoing service on first subscription on hold while allowing the messaging communication through the second subscription during the defined time period. In case of absence of any messaging event (e.g., a MO or MT based messaging event) through the second subscription till the expiry of the defined time period, the first subscription and the second subscription may be synchronized based on a determined duty-cycle based RF resource sharing procedure defined by a pause and resume modes. The network parameters pertaining to the first subscription may be re-evaluated (e.g., repetition of operation 304) (e.g., by the mobile device) and based thereupon, the RF-resource may be re-allocated (e.g., by the mobile device) to the second subscription for another defined time period (e.g., a second defined time period). Finally, the ongoing service may be resumed through the first subscription upon occurrence of a messaging event through the second subscription during at least one of a) the defined time period, b) synchronization between the first and second subscription; and/or c) the other defined time period. Such an example of RF-sharing has been further diagrammatically illustrated in FIG. 8.

In an example operation, the identification of SMS message reception may be performed based on detecting whether a user (e.g., of the mobile device) wishes to receive an incoming SMS message on a Peer SIM (e.g., a SIM associated with the second subscription) during an ongoing VoLTE call (e.g., an ongoing service associated with the first subscription). In some example embodiments, the user may send an indication to a SIM connection point (CP) from a user-interface (UI) (e.g., a user interface of the mobile device). Upon receiving such a user-indication, the VoLTE call may be held on HOLD and the Peer SIM may be resumed (e.g., the Peer SIM may be permitted access to the RF resources). For an originating (e.g., MO) SMS message, the user is allowed, from a user-interface (UI) perspective, to share the SMS message to be sent using the Peer SIM during the ongoing VoLTE call. For example, a user interface of the mobile device may enable the user to input a message to be sent via SMS and/or a destination for the SMS message. Upon detecting an MO SMS trigger from the user (e.g., when the user has typed the message and triggered its sending), the VoLTE call is kept on HOLD and the Peer SIM is resumed. Such example of RF-sharing has been further diagrammatically illustrated in FIG. 9.

Figure 4:
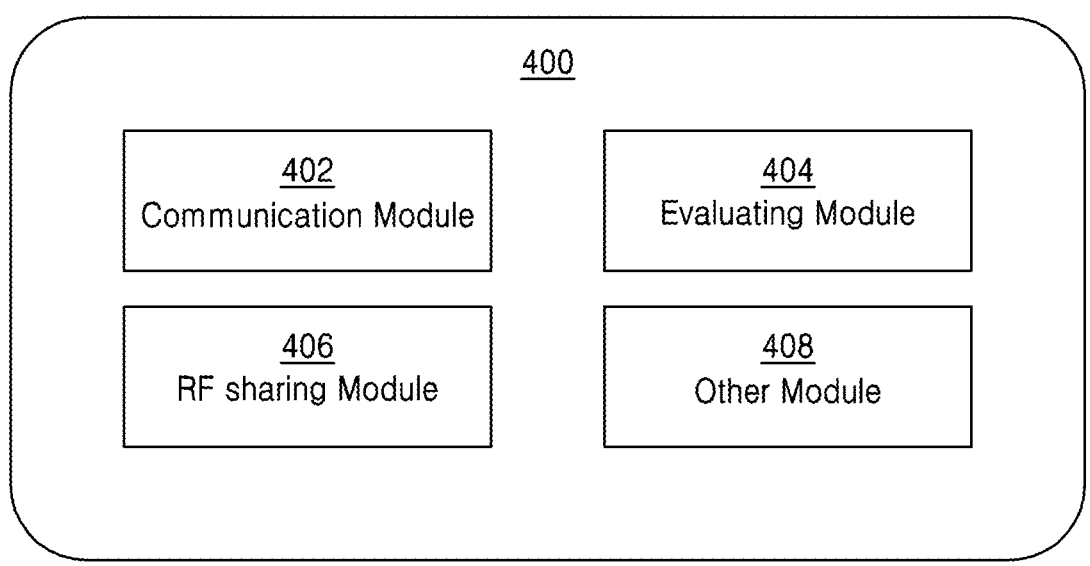
FIG. 4 shows a system in accordance with some example embodiments of the inventive concepts.

FIG. 4 illustrates a detailed internal construction of a system 400 for a telecommunication device in accordance with some example embodiments of the inventive concepts. According to some example embodiments, the system 400 may be a mobile device (e.g., the mobile device discussed in association with FIG. 3. The system 400 may include a communication module 402 configured to perform the operation 302, an evaluating module 404 configured to perform the operation 304, and/or an RF sharing module 406 configured to perform the operation 306. Likewise, there may be a miscellaneous module 408 within the system 400 configured to facilitate operational-interconnections among the communication module 402, the evaluating module 404, and/or the RF sharing module 406, and may be configured to perform other ancillary-functions. The communication module 402, the evaluating module 404, the RF sharing module 406, the miscellaneous module 408, and/or the mobile device are described in further detail in association with FIG. 11.

Figure 5:
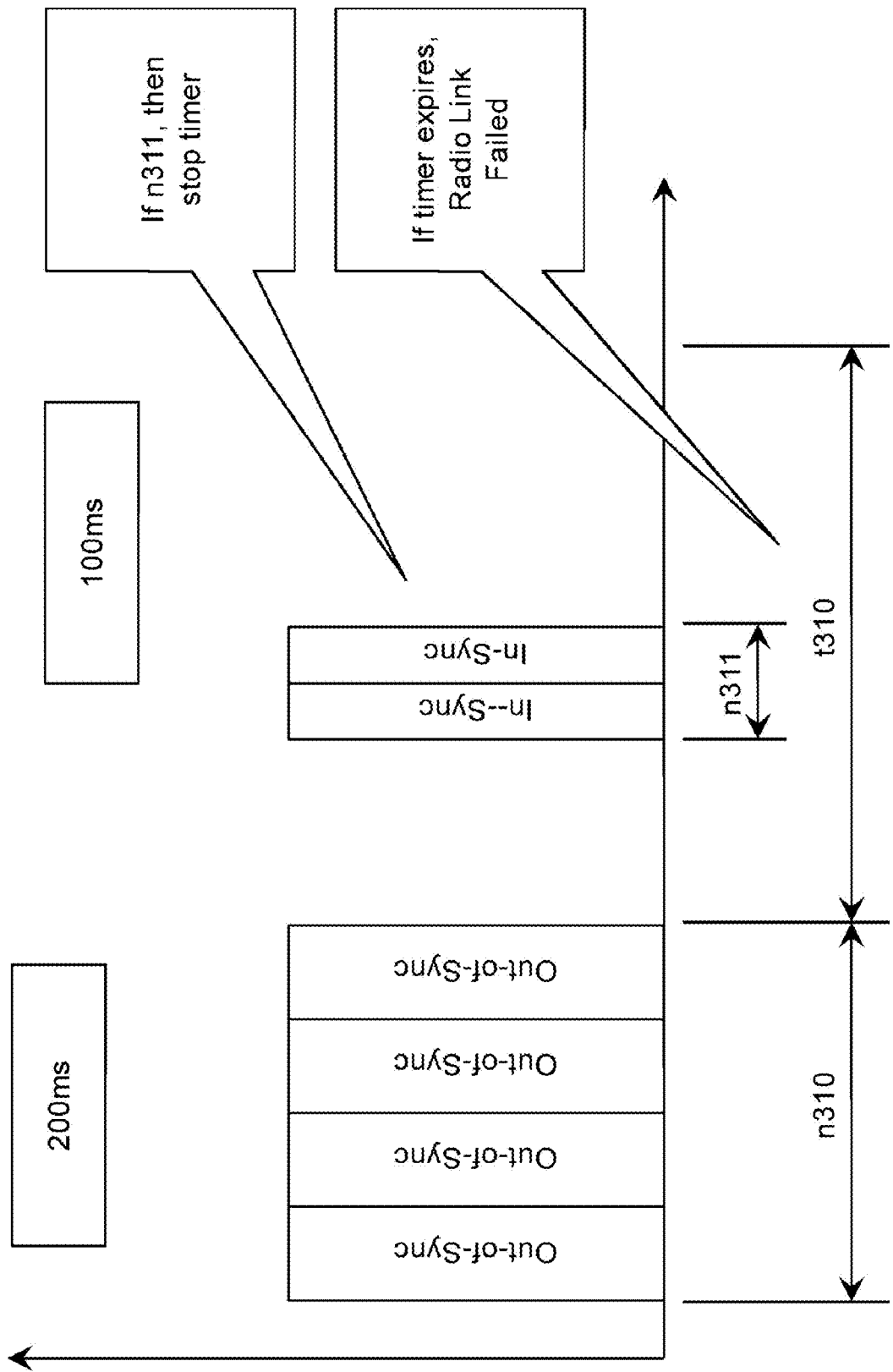
FIG. 5 shows a conventional procedure followed by a user-equipment (UE) in LTE networks to check a radio-link.

FIG. 5 illustrates a conventional procedure performed by a user-equipment (UE) in an LTE network to check whether a radio link of the UE is in-sync.

The UE may monitor reference signals (RS) in a downlink of the radio link. Based on the signal strength of the RS, e.g., Reference Signal Received Power (RSRP), the UE may determine whether the UE is able to decode a Physical Downlink Control Channel (PDCCH) of the radio link based on a certain-set of defined parameters provided in the 4G-LTE standards. Different UEs may have different RSRP thresholds by which a respective UE may determine that the respective UE is unable to decode the PDCCH. If the reference signals have enough signal strength such that the UE may decode the PDCCH consistently, then the radio link is "in-sync", otherwise the radio link is "out of sync" (e.g., with an eNodeB).

An example procedure for determining if the radio link has failed due to being "out of sync" is shown in FIG. 5. As may be seen, there are at least three example parameters shown in FIG. 5 that have been further elaborated in forthcoming paragraphs. One of ordinary skill in the art would understand that n310, t310 and/or n311 are parameters known in the art. The below descriptions of these parameters are provided as examples and do not limit the ordinary and customary meanings of the n310, t310 and/or n311 parameters as known in the art.

a) n310: This parameter indicates the number of 200 ms intervals during which the UE is unable to successfully decode the PDCCH due to low RSRP detected before the radio link is considered to no longer be "in-sync" (e.g., in synchronization). That is, this parameter indicates the number of times in which the UE is unable successfully decode 20 consecutive frames in the downlink.

b) t310: This parameter is a timer, in seconds, during which the UE attempts to get back "in-sync" with the eNodeB.

c) n311: This parameter indicates the number of 100 ms intervals during which the UE successfully decodes the PDCCH before the UE is determined to be back "in-sync" with the eNodeB. In other words, the n311 parameter indicates the number of times in which the UE successfully decodes 10 consecutive frames in the downlink in order for the UE to assume the radio link is in-sync.

In operation, if the UE detects n310 consecutive out-of-sync indications, it starts the t310 timer. If the timer expires without the UE detecting n311 consecutive in-sync indications, the radio link is held to have failed. If the UE detects n311 consecutive in-sync indications prior to the t310 timer expiring, then the timer is stopped and the link has not failed.

Figure 6:
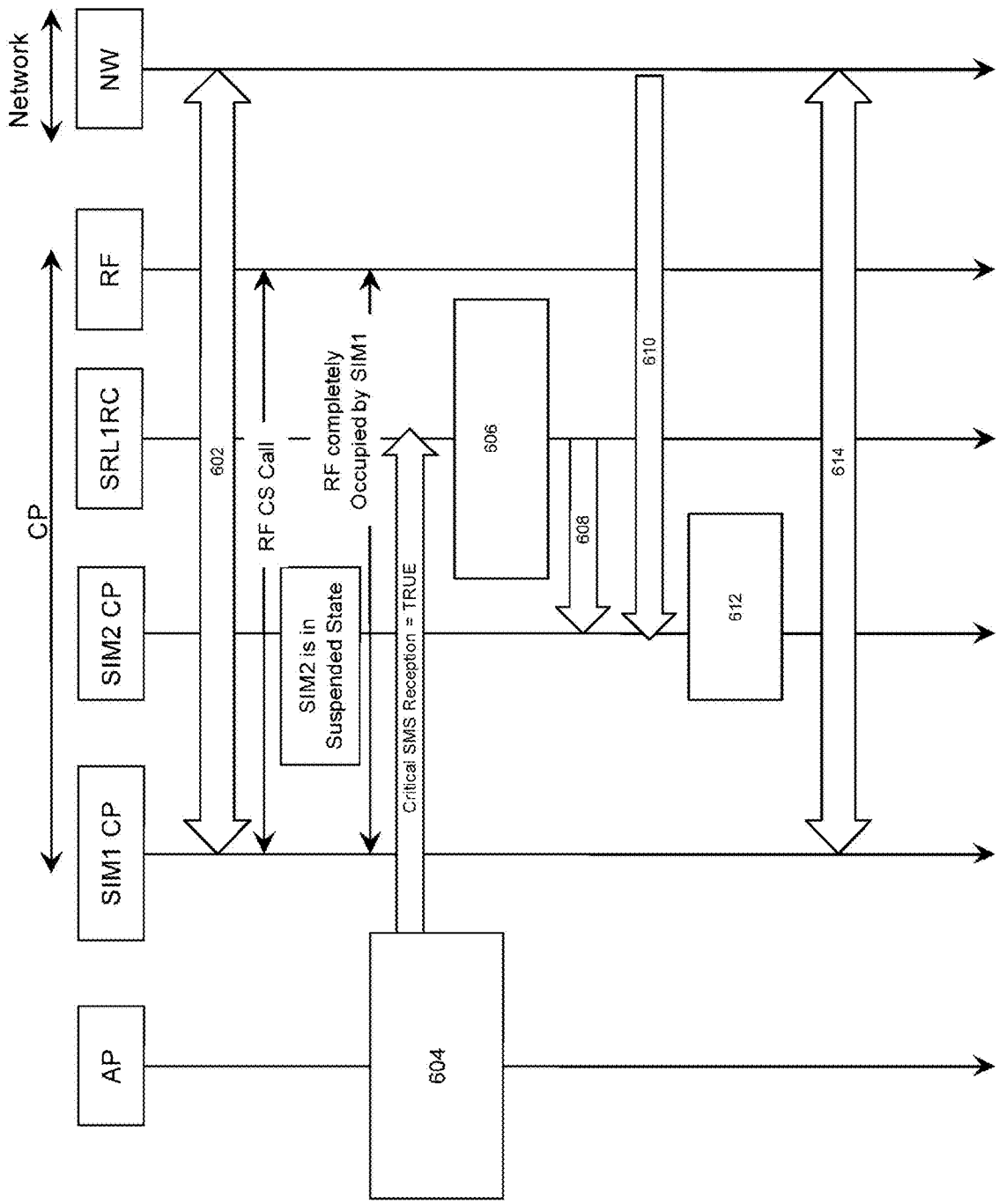
FIG. 6 shows an example implementation of the method of FIG. 3 in which an ongoing service is resumed through a first subscription when a defined time period expires or a messaging event occurs, in accordance with some example embodiments of the inventive concepts.

FIG. 6 illustrates another example-implementation of method of FIG. 3 and accordingly depicts an example RF resource-sharing based operation between a main SIM (e.g., a SIM1) and a peer SIM (e.g., a SIM2). While the CP depicts a central processing arrangement within a mobile device, an access point (AP) includes a user-interface (UI) configured to allow the user to control the RF resource-sharing between the SIMs (e.g., the SIM1 and the SIM2). The CP may be divided into SIM1 CP, SIM 2 CP, and/or SRL1RC (e.g., the mobile device) as a decision-maker for RF resource sharing, and a radio frequency based transceiver (RF).

At operation 602, a VoLTE call may be established through the SIM1. Accordingly, the RF resource is entirely or largely allocated to the SIM1 and the SIM2 is left in a suspended state.

At operation 604, a user (e.g., a user of the mobile device) may input a request to receive and/or send an SMS message using the SIM2. For example, the user may actuates a control within the AP (shown in FIGS. 10A and 10B). The VoLTE call may be immediately or promptly placed on HOLD. Operation 604 may be the same as or similar to operation 302.

At operation 606, the SRL1RC may evaluate conditions for resuming a peer stack (e.g., causing the SIM2 to leave the suspended state and access the RF resource). Operation 606 may be the same as or similar to operation 304.

In an example, one or more of the below parameters may be evaluated:

1. The Radio Access Technologies (RATs) used by the SIM1 and the SIM2. For example, the SIM1 may use VoLTE and the SIM2 may use VoLTE, 3G, 2G, etc.;
2. One or more signal strengths (e.g., the RSRP of reference signals as discussed in association with FIG. 5) and/or a BLER; and/or
3. One or more RTCP timers.

If the evaluation of the conditions for resuming the peer stack fails, the SRL1RC may immediately or promptly cause an indication to be provided to the user about the inability to receive and/or send the SMS message and the VoLTE call at SIM1 is resumed or continued. Alternatively, if the evaluation of the conditions for resuming the peer stack fails, the SRL1RC may keep evaluating the conditions periodically (e.g., repeats operation 606) and cause an indication of the same (e.g., that resuming the peer stack fails and/or that the SRL1RC continues to evaluate the conditions periodically) be provided to the user (e.g., through alerts).

However, if the evaluation of the conditions for resuming the peer stack are fulfilled, then the VoLTE call on SIM1 is maintained and/or placed on HOLD. A timer X may be calculated by the SRL1RC. In an example, when the SIM1 uses LTE, the timer X may be determined based on the N310 and T310 parameters as earlier mentioned in association with FIG. 5.

For Example, if the N310 parameter is 20 (1 to 20 as is known in the art), out of sync indications are reported in 200 ms intervals, and the T310 timer duration is 1 second, then, the timer X may be calculated as X<(N310*200 ms+T310), e.g., 20*200 ms+1 sec=5 sec.

Timer X may be calculated (e.g., by the mobile device) as X<(N310*200 ms+T310) (e.g., 20*200 ms+1 sec=5 sec). At operation 608, SIM2 may be resumed and the RF resource may be allocated to the peer stack (e.g., the stack associated with SIM2) for the duration of timer X (e.g., 5 seconds). At operation 610, an incoming SMS message (e.g., an OTP message) may be received through the SIM2. At operation 612, SIM 2 may be moved to (e.g., placed in by the mobile device) the 'suspend' state and the timer X may be stopped. At operation 614, the held VoLTE call on the SIM1 may be resumed (e.g., the mobile device may cause the SIM1 to leave a suspended/hold state and access the RF resource).

In an example, as long as the VoLTE call is on Hold at the SIM1, the RF resource will be granted for SIM2 for every discrete reception (Drx) cycle for paging channel (PCH) operation and limited operations may be allowed at SIM2. In some example embodiments, the SIM2 during such state (e.g., during the RF resource grant to the SIM2) may not respond to any type of paging messages other than SMS messages. For example, no packet-switched (PS) registration may be permitted through the SIM2 as long as a circuit-switched (CS) call is on HOLD at the SIM1. In another example, neither inter-frequency nor inter-RAT measurements may be permitted through the SIM2 during the time the CS call is on HOLD at the SIM1.

As may be understood, the operations 608 through 614 may collectively correspond to operation 306 of FIG. 3.

Figure 7:
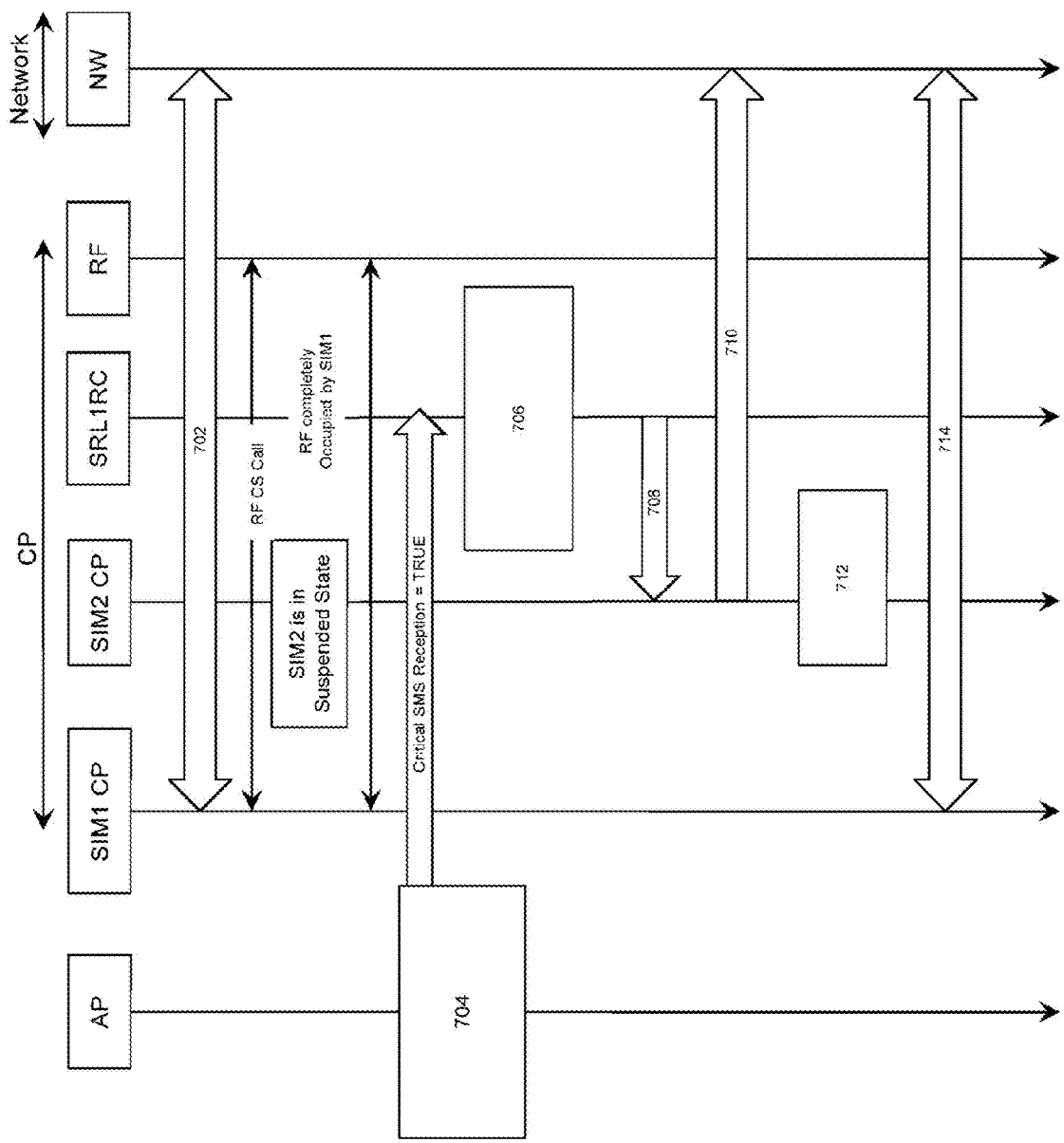
FIG. 7 shows another example implementation of the method of FIG. 3 in which a first and second subscription are synchronized based on a determined duty cycle based RF resource sharing procedure when a defined time period expires without occurrence of a messaging event, in accordance with some example embodiments of the inventive concepts.

FIG. 7 illustrates another example-implementation of method of FIG. 3, such that operations 702 through 708 correspond to operations 602 till 608, respectively.

At operation 710, an outgoing SMS message from SIM2 is triggered by the user. Thereafter, operations 712 and 714 correspond to operations 612 and 614, respectively.

Figure 8:
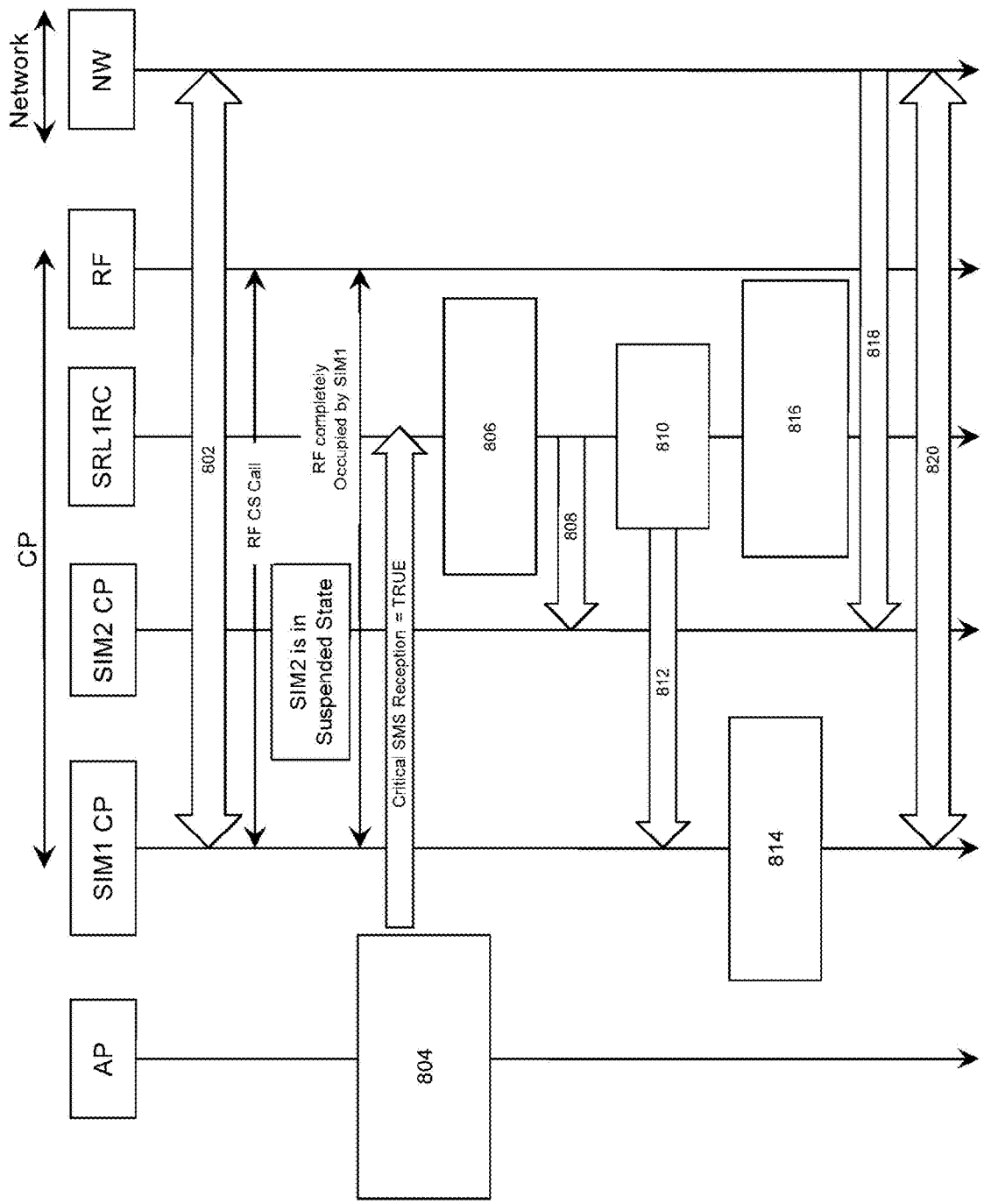
FIG. 8 shows another example implementation of the method of FIG. 3 in which network parameters of a first subscription are re-evaluated and the RF-resource is re-allocated to the second subscription, in accordance with some example embodiments of the inventive concepts.

FIG. 8 illustrates another example-implementation of method of FIG. 3, such that operations 802 through 808 correspond to operations 602 through 608, respectively.

At operation 810, the timer X may expire.

At operation 812, instead of resuming the VoLTE call on the SIM1, the SRL1RC may grant the RF resource to SIM1 to attempt to synchronize with a server through which the VoLTE call is communicated.

At operation 814, the SIM1 succeeds in synchronizing with the server, e.g., the T311 and RTP related timers are stopped.

At operation 816, the SRL1RC may enable a 200 ms duty cycle to keep both stacks (e.g., a first stack associated with the SIM1 and a second stack associated with the SIM2) in sync. If the timer X expires before the SMS message origination and/or reception, such a "Fixed 200 ms Duty Cycle" based RF sharing algorithm is executed based on pause and resume modes. Nevertheless, the whole procedure is guarded (e.g., time-restricted) under a "Fixed Max Timer Y" (e.g., of 10 seconds). In an example, Timer Y=2 (Timer X).

At operation 818, an incoming SMS message (e.g., an OTP message) may be received through the SIM2.

At operation 820, the VoLTE call maintained and/or placed on HOLD at SIM 1 may be resumed.

Figure 9:
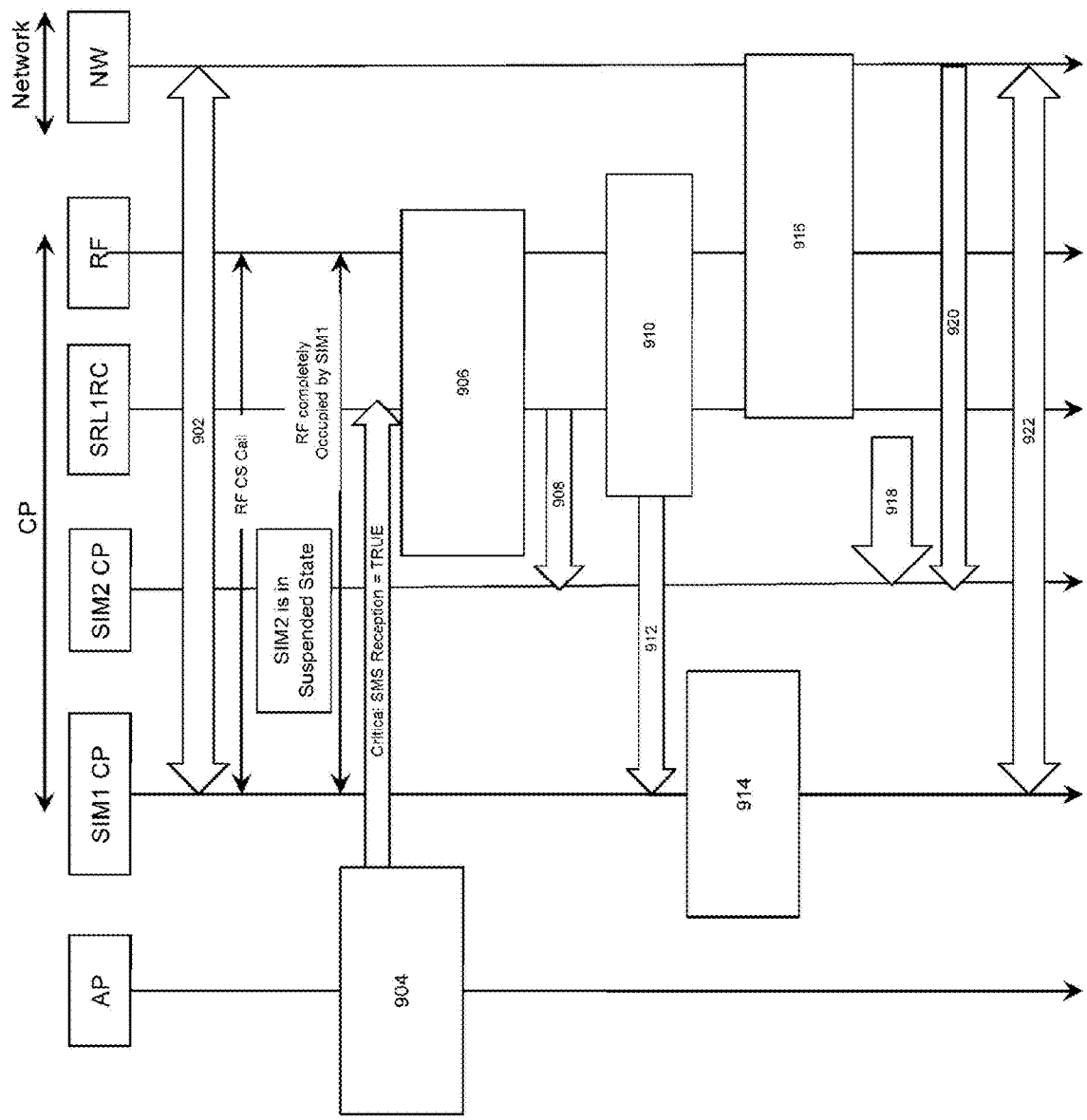
FIG. 9 shows an example implementation of the method of FIG. 3 in which an indication of an incoming message is received from a user interface, in accordance with some example embodiments of the inventive concepts.

FIG. 9 illustrates another example-implementation of method of FIG. 3, such that operations 902 through 914 correspond to operations 802 through 814, respectively.

At operation 916, the SRL1RC may again evaluates the conditions to resume SIM2 (e.g., like repeating operation 606) and may re-calculate the timer X. Accordingly, the timer (X) may be extended further (say to the duration of timer Y, e.g., 10 seconds) with repeated in syncs with respect to the SIM1. The whole procedure is guarded under Fixed Max Timer Y (e.g., of 10 seconds). Accordingly, the SIM2 may take maximum (e.g., upper limit and/or threshold) defined and/or fixed time (e.g., 10 seconds) in multiple threshold time with the RF sharing algorithm. For example, if the SMS message reception and/or origination procedure fails within such fixed maximum time (e.g., 10 seconds), then a failure notification may be sent to user and the VoLTE call may be resumed through the SIM1.

Thereafter, operations 918, 920, and 922 correspond to operations 608, 610, and 614, respectively.

Figure 10A:
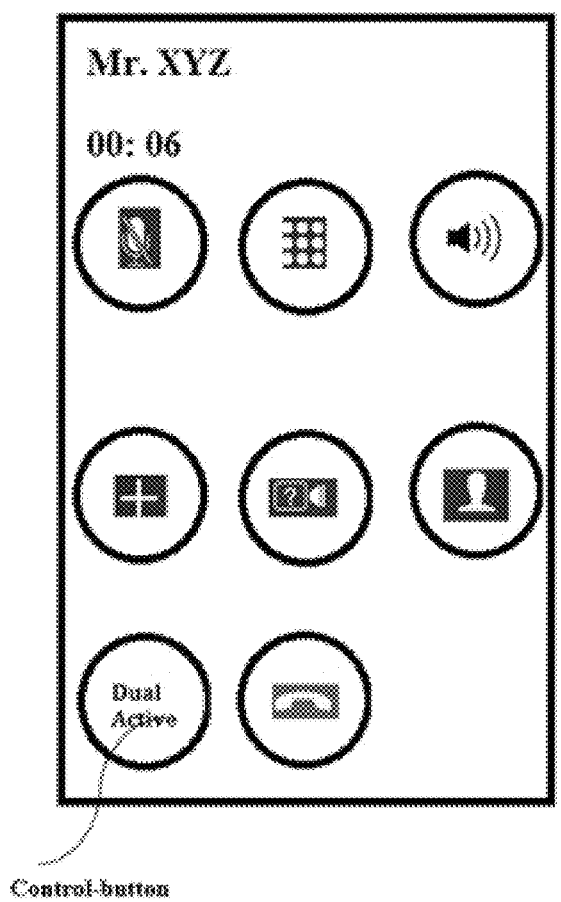
FIGS. 10A and 10B show example-manifestation of results of the method of FIG. 3, in accordance with some example embodiments of the inventive concepts.
Figure 10B:
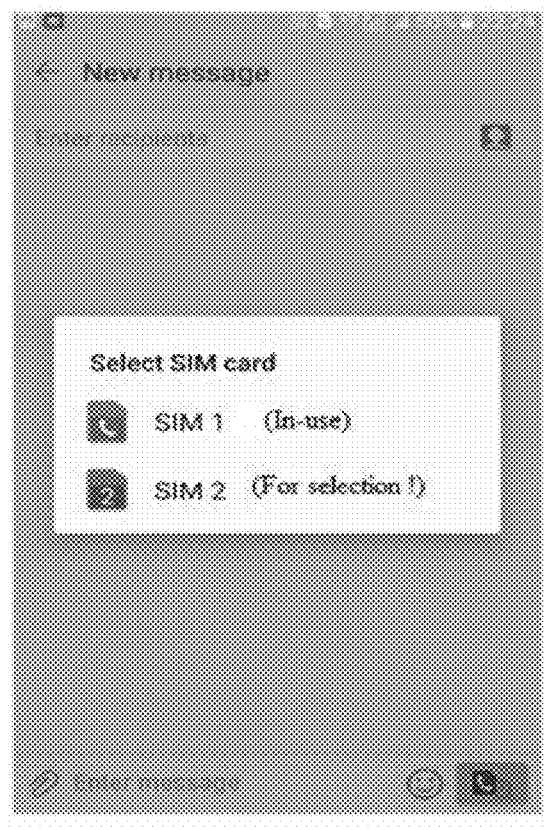

FIG. 10A illustrates an example control-button and/or option (e.g., Dual Active) within the user-interface during an ongoing VoLTE call (e.g., to a contact Mr. X) through the SIM1. Actuation of said control-button in FIG. 10A corresponds to the operation 604 described in association with FIG. 6. Accordingly, as shown in FIG. 10B, the user may be provided an option to select the SIM2 for sending an SMS message. The SIM1, despite being available, may not be allowed for selection owing to the ongoing VoLTE call.

However, instead of operating upon the control-button in real-time (e.g., during the ongoing VoLTE call through the first subscription), the user may be provided another control-setting based option to allow automatic activation of RF-sharing as a part of the defined setting discussed in the FIG. 3. In an example, such prior done control-setting (e.g., set conditions that, when satisfied, causes access to the RF resource to be provided to the SIM2) automatically allows the message communication through the second subscription, in some cases while the first subscription is also active.

Further, while the description of FIGS. 6 through 10B depict RF resource sharing with the SIM2 for SMS communication, however such RF resource sharing may be performed with the SIM2 for internet browsing through SIM 2 while the VoLTE call is on HOLD at the SIM1.

Figure 11:
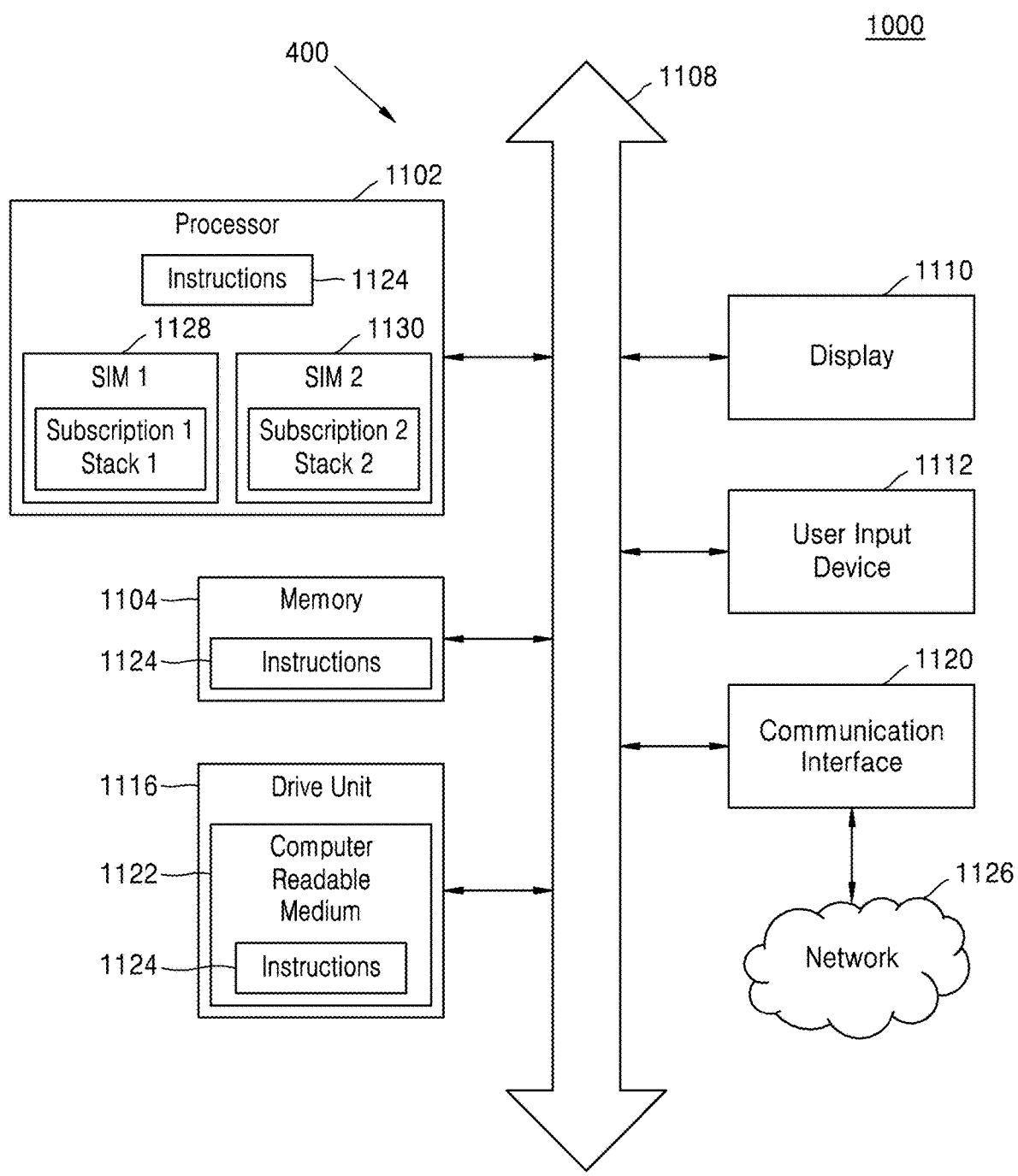
FIG. 11 shows an example computing-device based implementation of the system as depicted in FIG. 4, in accordance with some example embodiments of the present subject matter.

FIG. 11 shows a hardware configuration of the system 400 in the form of a computer-system 1100 based telecommunication device, according to some example embodiments. The computer system 1100 may include a set of instructions that may be executed (e.g., by a processor 1102) to cause the computer system 1100 to perform any one or more of the methods disclosed herein. For example, in some example embodiments, operations described herein as being performed by any or all of the mobile device, the communication module 402, the evaluation module 404, the RF sharing module 406, and the miscellaneous module 408 (e.g., the operations of the methods discussed in association with FIGS. 3 and 6-9) may be performed by at least one processor (e.g., the processor 1102) executing program code that includes instructions corresponding to the operations. The instructions may be stored in a memory (e.g., a memory 1104 discussed below) of the computer-system 1100 (e.g., the mobile device). The computer system 1100 may operate as a standalone-device or may be connected, e.g., using a network, to other computer systems and/or peripheral devices. The computer system 1100 may include two or more SIMs including a first SIM 1128 (e.g., SIM1) and a second SIM 1129 (e.g., SIM2). Each SIM may be associated with a corresponding subscription (e.g., subscription1 and subscription2) with one or more respective wireless services. Each SIM may also be associated with a corresponding protocol stack (e.g., stack1 and stack2) within the computer system 1100.

In a networked deployment, the computer system 1100 may operate in the capacity of a server and/or as a client user computer in a server-client user network environment, and/or as a peer computer system in a peer-to-peer (or distributed) network environment. The computer system 1100 may also be implemented as or incorporated across various devices, such as a personal computer (PC), a tablet PC, a personal digital assistant (PDA), a mobile device (e.g., the mobile device discussed in association with FIGS. 3-4 and 6-10B), a palmtop computer, a laptop computer, a desktop computer, a communications device, a wireless telephone, a land-line telephone, a web appliance, a network router, switch and/or bridge, and/or any other machine capable of executing a set of instructions (sequential and/or otherwise) that specify actions to be taken by that machine. Further, while a single computer system 1100 is illustrated, the term "system" shall also be taken to include any collection of systems and/or sub-systems that individually and/or jointly execute a set, or multiple sets, of instructions to perform one or more computer functions.

The computer system 1100 may include at least one processor 1102 (also referred to as the "processor") e.g., a central processing unit (CPU), a graphics processing unit (GPU), or both. The processor 1102 may be a component in a variety of systems. For example, the processor 1102 may be part of a standard personal computer and/or a workstation. The processor 1102 may be one or more general processors, microprocessors, processor cores, multi-core processors, multiprocessors, digital signal processors, application specific integrated circuits, field programmable gate arrays, servers, networks, digital circuits, analog circuits, combinations thereof, and/or other now known and/or later developed devices for analysing and processing data. The processor 1102 may implement a software program, such as code generated manually (e.g., programmed).

The computer system 1100 may include a memory 1104 that may be communicatively coupled to a bus 1108. The memory 1104 may include, but is not limited to non-transitory computer readable storage media such as various types of volatile and/or non-volatile storage media, including but not limited to random access memory, read-only memory, programmable read-only memory, electrically programmable read-only memory, electrically erasable read-only memory, flash memory, magnetic tape and/or disk, optical media and/or the like. In an example, the memory 1104 includes a cache and/or random access memory for the processor 1102. In some examples, the memory 1104 is separate from the processor 1102, such as a cache memory of a processor, the system memory, and/or other memory. The memory 1104 may be an external storage device and/or database for storing data. The memory 1104 is operable to store instructions executable by the processor 1102. The functions, acts and/or tasks illustrated in the figures or described herein may be performed by the processor 1102 (e.g., the programmed processor) for executing the instructions stored in the memory 1104. The functions, acts and/or tasks are independent of the particular type of instructions set, storage media, processor and/or processing strategy and may be performed by software, hardware, integrated circuits, firm-ware, micro-code and/or the like, operating alone or in combination. Likewise, processing strategies may include multiprocessing, multitasking, parallel processing and/or the like.

As shown, the computer system 1100 may or may not further include a display unit 1110, such as a liquid crystal display (LCD), an organic light emitting diode (OLED), a flat panel display, a solid state display, a cathode ray tube (CRT), a projector, a printer and/or other now known and/or later developed display device for outputting determined information. The display 1110 may be configured as an interface for the user to interact with the functioning of the processor 1102, or specifically as an interface with the software (e.g., executed computer-readable instructions) stored in the memory 1104 and/or in the drive unit 1116. For example, the display 1110 may output one or more notifications and/or alerts to the user, and/or receive input data and/or selections from the user.

Additionally, the computer system 1100 may include an input device 1112 configured to allow a user to interact with any of the components (e.g., the processor 1102) of system 1100. The computer system 1100 may also include a disk and/or optical drive unit 1116. The disk drive unit 1116 may include a non-transitory computer-readable medium 1122 in which one or more sets of instructions 1124, e.g. software, may be embedded. Further, the instructions 1124 may embody one or more of the methods or logic as described. In a particular example, the instructions 1124 may reside completely, or at least partially, within the memory 1104 and/or within the processor 1102 during execution by the computer system 1100.

The inventive concepts provide a non-transitory computer-readable medium that stores instructions 1124 and/or receives, and/or provides the instructions 1124 to the processor 1102 for execution, responsive to a propagated signal so that a device (e.g., the computer system 1100) connected to a network 1126 may be configured to communicate voice, video, audio, images and/or any other data over the network 1126. Further, the instructions 1124 may be transmitted and/or received over the network 1126 via a communication port and/or interface 1120 and/or using a bus 1108. The communication port and/or interface 1120 may be a part of the processor 1102 and/or may be a separate component. The communication port 1120 may be created in software and/or may be a physical connection in hardware. The communication port 1120 may be configured to connect with a network 1126, external media, the display 1110, and/or any other components (e.g., the processor 1102) in system 1100, or combinations thereof. The connection with the network 1126 may be a physical connection, such as a wired Ethernet connection and/or may be established wirelessly as discussed later. Likewise, the additional connections with other components of the system 1100 may be physical connections and/or may be established wirelessly. The network 1126 may alternatively be directly connected to the bus 1108.

The network 1126 may include wired networks, wireless networks, Ethernet Audio Video Bridging (AVB) networks, or combinations thereof. The wireless network may be a cellular telephone network, an IEEE 802.11, 802.16, 802.20, 802.1Q and/or Worldwide Interoperability for Microwave Access (WiMax) network. Further, the network 1126 may be a public network, such as the Internet, a private network, such as an intranet, or combinations thereof, and may utilize a variety of networking protocols now available and/or later developed including, but not limited to Transmission Control Protocol (TCP)/Internet Protocol (IP) based networking protocols. The system is not limited to operation with any particular standards and protocols. For example, standards for Internet and other packet switched network transmission (e.g., TCP/IP, User Datagram Protocol (UDP)/IP, Hyper Text Markup Language (HTML), HyperText Transfer Protocol (HTTP), etc.) may be used.

As discussed above, conventional mobile devices are unable to receive message communications through a second subscription while an ongoing communication is performed through a first subscription without the use of additional hardware (e.g., a second transceiver) and the disadvantages associated therewith (e.g., additional cost, power consumption and/or physical space). Accordingly, users of conventional devices without the additional hardware are unable to send and/or receive message communications through the second subscription without disconnecting from the ongoing communication performed through the first subscription, resulting in service interruption of the ongoing communication, excessive delay in performing message communication, missed message communications, and/or excessive resource consumption (e.g., processor, memory, bandwidth, and/or power resources) as missed message communications are repeated. However, at least by virtue of aforesaid features, the present subject matter proposes a system and method that identifies critical SMS origination and/or reception, evaluates the conditions to resume peer stack during VoLTE call on Main Stack and facilitates an efficient RF resource sharing algorithm. Based thereupon, the present subject matter renders a seamless user-experience as service interruption is reduced or eliminated. The proposed solution avoids the time-delay due to disconnecting the CS Call at SIM1 for availing usage of the SIM2, followed by re-establishment of the CS call again, thereby overcoming the disadvantages of the conventional mobile devices by reducing or preventing service interruption of the ongoing communication, excessive delay in performing message communication, missed message communications and/or excessive resource consumption (e.g., processor, memory, bandwidth, and/or power resources) and without the disadvantages of additional hardware (e.g., a second transceiver) such as additional cost, power consumption and/or physical space.

In a nutshell, the present subject matter at least avoids interrupts in voice call and continuity in voice call may be guaranteed or improved. The solution proposed provides method for sharing Radio frequency (RF) between multiple stacks in a multi-SIM device, to send/receive short message services on a second subscriber identity module (SIM) during an ongoing first service on a first SIM of the multi-SIM device.

The solution proposed avoids the limitation of Dual SIM Dual Standby during SMS origination and reception based on user request. A current limitation of mobile device user interface disabling SMS origination from peer SIM is solved, and a user is provided option to select SIM to send an SMS during VoLTE call. Moreover, the present subject matter is extendable to cover packet switching PS operation on peer SIM during VoLTE Call on Main SIM.

While specific language has been used to describe some example embodiments of the disclosure, any limitations arising on account of the same are not intended. As would be apparent to a person in the art, various working modifications may be made to the method in order to implement the inventive concepts as taught herein.

The drawings and the forgoing description give examples of some example embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and/or use of material, are possible. The scope of embodiments is at least as broad as given by the following claims.

Benefits, other advantages, and solutions to disadvantages and/or challenges have been described above with regard to some example embodiments. However, the benefits, advantages, solutions to disadvantages and/or challenges, and/or any component(s) that may cause any benefit, advantage, and/or solution to occur and/or become more pronounced are not to be construed as a critical, required, and/or essential feature and/or component of any or all the claims.

We claim:

1. A method performed by a mobile device for selectively allowing radio-frequency (RF) resource sharing between a plurality of subscriptions associated with a plurality of subscriber identity modules (SIMs) in the mobile device, said method comprising:
   transferring access to an RF resource from a first subscription among the plurality of subscriptions to a second subscription among the plurality of subscriptions during an ongoing service through the first subscription based on occurrence of a condition;
   evaluating one or more network parameters pertaining to communication through the first subscription; and
   causing the first subscription and the second subscription to share access to the RF resource for a first defined time period based on the evaluating such that message communication through the second subscription is enabled without disconnecting the first subscription from the ongoing service,
   wherein the causing the first subscription and the second subscription to share the RF resource comprises:
   causing the ongoing service to be placed on hold on the first subscription while allowing the message communication through the second subscription during the first defined time period by allocating the RF resource to the second subscription,
   synchronizing the first subscription and the second subscription based on a determined duty-cycle based RF resource sharing procedure defined by pause and resume modes, said synchronizing being performed based on a mobile-originated or mobile-terminated based messaging event not being transferred through the second subscription within the first defined time period,
   re-evaluating the one or more network parameters pertaining to the first subscription, re-allocating the RF resource to the second subscription for a second defined time period based upon the re-evaluating, and causing the ongoing service to resume through the first subscription upon occurrence of said messaging event through the second subscription during at least one of:
the first defined time period,
the synchronizing, or
the second defined time period.

2. The method as claimed in claim 1, wherein the condition is at least one of:
a request received via a user-interface during the ongoing service at the first subscription, the request requesting said message communication through the second subscription, or
a defined setting to allow said message communication through the second subscription during the ongoing service through the first subscription.

3. The method as claimed in claim 1, wherein the ongoing service corresponds to at least one of:
a Voice over Long Term Evolution (VoLTE) call,
a communication on a packet-switched network, or
a communication on a circuit-switched network.

4. The method as claimed in claim 2, wherein said condition is defined by at least one of:
sending or receiving a Short Message Service (SMS) message,
sending or receiving a packet-switched message communication, or
sending or receiving a message via an internet-browsing session.

5. The method as claimed in claim 1, wherein communications are performed through the first subscription and the second subscription over a radio access technology or a mobile communication standard based on at least one of LTE, Wideband Code Division Multiple Access (WCDMA), CDMA, $4^{th}$ Generation (4G), $3^{rd}$ Generation (3G), or $2^{nd}$ Generation (2G).

6. The method as claimed in claim 1, wherein the evaluating is based on at least one of: a signal strength, block error rate (BLER), or a real-time transport protocol (RTP) control protocol (RTCP) timer, the evaluating including determining a probability of whether an SMS message will be sent or received through the second subscription.

7. The method as claimed in claim 1, wherein the first defined time period is calculated in real-time based on:
N310, T310 and RTCP timers when communications are performed through the first subscription with the ongoing service over 4G LTE,
N313, T313, T314 and T315 when communications are performed through the first subscription with the ongoing service over 3G Universal Mobile Telecommunications Service (UMTS), and
a Slow Associated Control Channel (SACCH) count when communications are performed through the first subscription with the ongoing service over 2G Global System for Mobile Communications (GSM).

8. The method as claimed in claim 1, wherein the causing the first subscription and the second subscription to share the RF resource comprises:
causing the ongoing service to resume through the first subscription upon occurrence of said messaging event through the second subscription during the first defined time period or during said synchronizing.

9. A mobile device for selectively allowing radio-frequency (RF) resource sharing between a plurality of subscriptions associated with a plurality of subscriber identity modules (SIMs) in the mobile device, said mobile device comprising:
at least one processor configured to execute computer-readable instructions to
transfer access to an RF resource from a first subscription among the plurality of subscriptions to a second subscription among the plurality of subscriptions during an ongoing service through the first subscription based on occurrence of a condition,
evaluate one or more network parameters pertaining to communication through the first subscription, and
cause the first subscription and the second subscription to share the RF resource for a first defined time period based on the one or more network parameters such that message communication through the second subscription is enabled without disconnecting the first subscription from the ongoing service,
wherein the at least one processor is configured to execute the computer-readable instructions to:
cause the ongoing service to be placed on hold on the first subscription while allowing the message communication through the second subscription during the first defined time period by allocating the RF resource to the second subscription,
synchronize the first subscription and the second subscription based on a determined duty-cycle based RF resource sharing procedure defined by pause and resume modes, said synchronization being performed based on a mobile-originated or mobile-terminated based messaging event not being transferred through the second subscription within the first defined time period,
re-evaluate the one or more network parameters pertaining to the first subscription,
re-allocate the RF resource to the second subscription for a second defined time period based upon the re-evaluation, and
cause the ongoing service to resume through the first subscription upon occurrence of said messaging event through the second subscription during at least one of
the first defined time period,
the synchronization, or
the second defined time period.

10. The mobile device as claimed in claim 9, wherein the at least one processor is configured to execute the computer-readable instructions to:
determine whether the condition has occurred based on at least one of
a request received via a user-interface during the ongoing service at the first subscription, the request requesting said message communication through the second subscription, or
a defined setting to allow said message communication through the second subscription during the ongoing service through the first subscription.

11. The mobile device as claimed in claim 10, wherein said condition is defined by at least one of:
sending or receiving a Short Message Service (SMS) message,
sending or receiving a packet-switched message communication, or
sending or receiving a message via an internet-browsing session.

12. The mobile device as claimed in claim 9, wherein communications are performed through the first subscription and the second subscription over a radio access technology or a mobile communication standard based on at least one of LTE, WCDMA, CDMA, 4G, 3G, or 2G.

13. The mobile device as claimed in claim 10, wherein the at least one processor is configured to execute the computer-readable instructions to:
　cause the ongoing service to resume through the first subscription upon occurrence of said messaging event through the second subscription during the first defined time period or during said synchronization.

* * * * *